Patented Feb. 6, 1923.

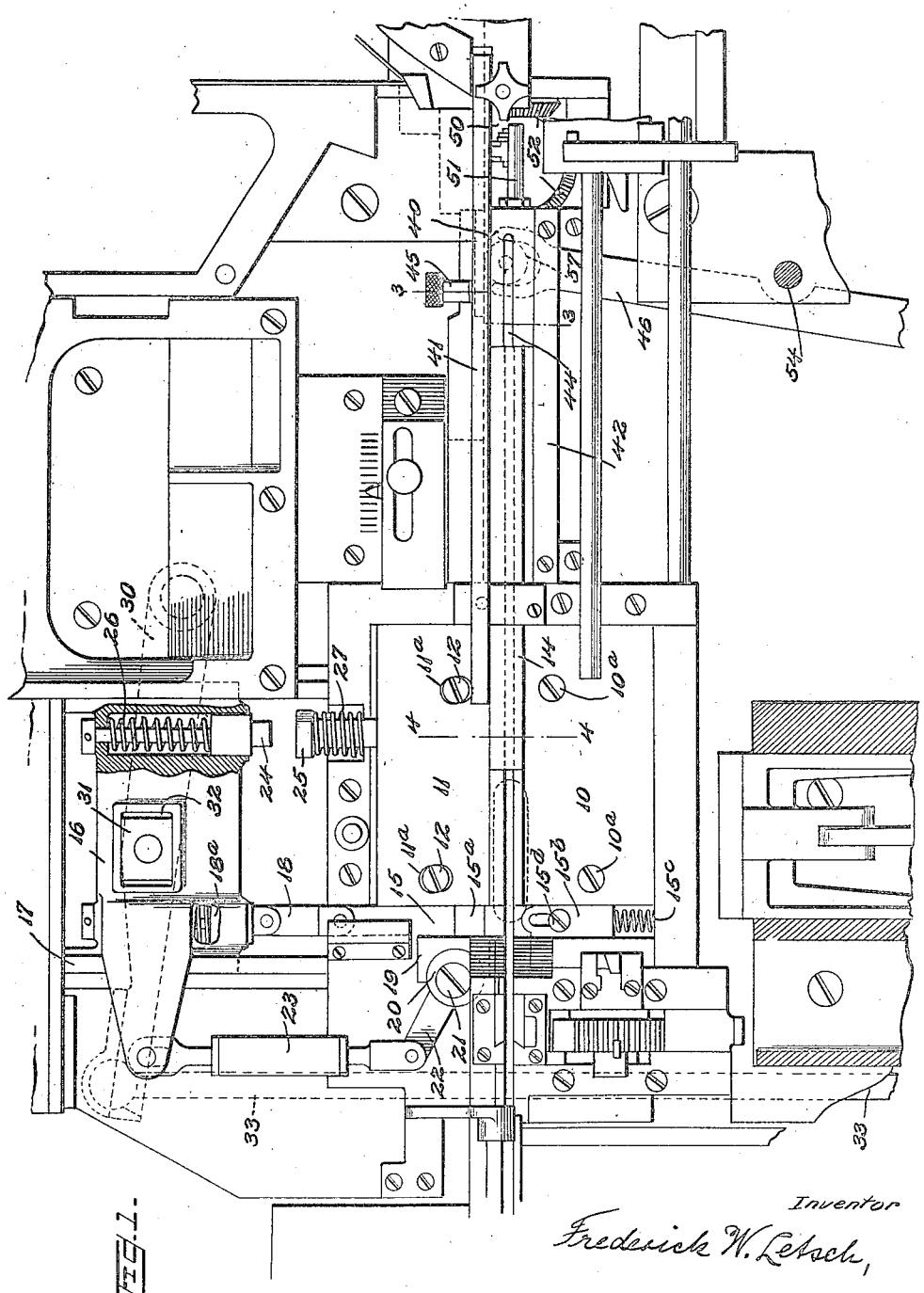

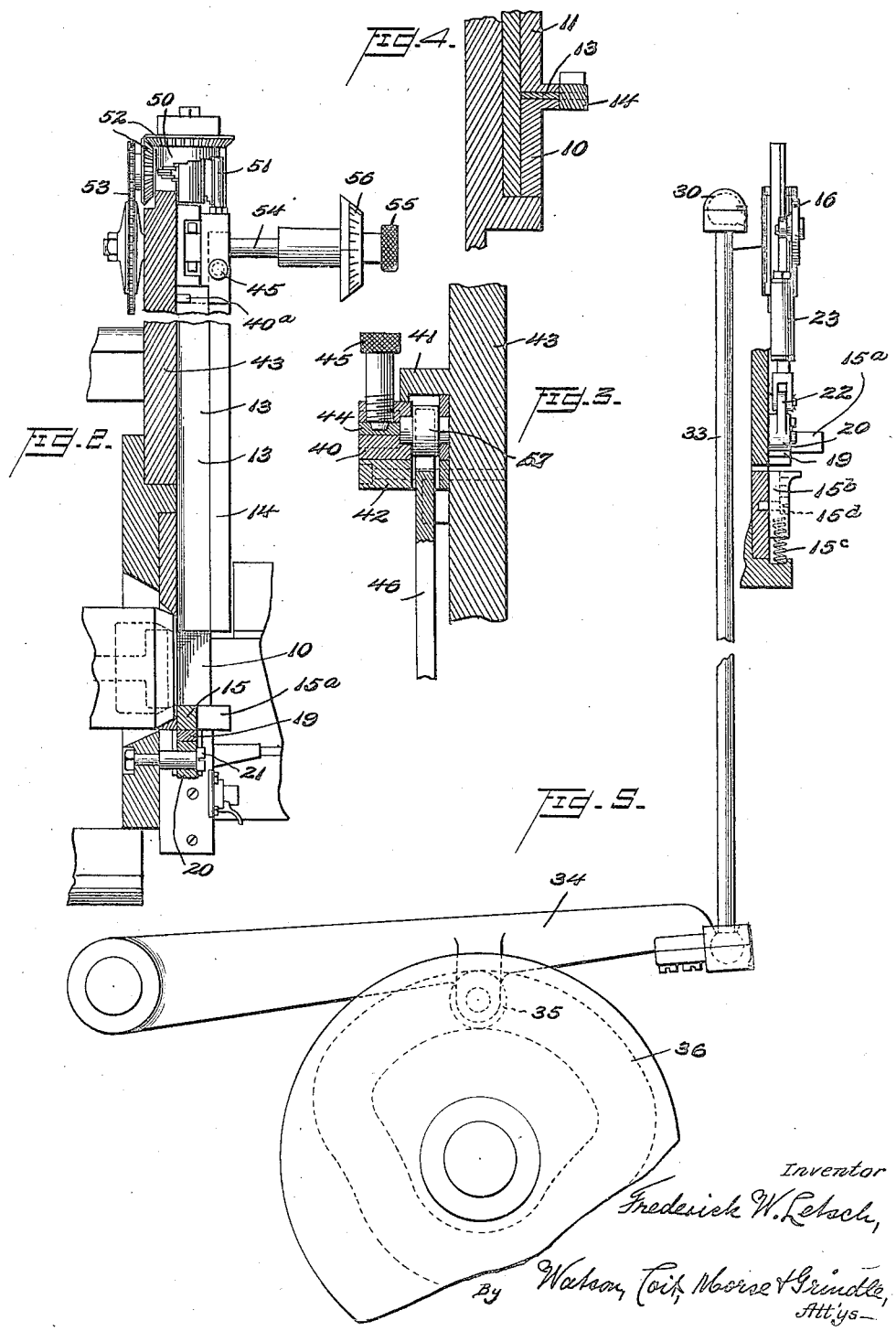

1,444,254

UNITED STATES PATENT OFFICE.

FREDERICK W. LETSCH, OF BALTIMORE, MARYLAND.

MOLD FOR TYPOGRAPHIC MACHINES.

Original application filed March 15, 1918, Serial No. 222,760. Divided and this application filed July 21, 1920. Serial No. 397,884.

*To all whom it may concern:*

Be it known that I, FREDERICK W. LETSCH, a citizen of the United States, and residing at Baltimore city, State of Maryland, have invented certain new and useful Improvements in Molds for Typographic Machines, of which the following is a specification.

This invention relates to a mold for typographic machines and particularly machines of the kind disclosed in my copending application, Serial No. 222,760, filed March 15, 1918, of which the present application is a division.

It is the object of the invention to provide a molding mechanism having fixed and movable mold blocks normally held separated with a suitable body piece arranged between them and also having means for clamping the movable block against the body piece, the body piece being adjustable for casting lines of different lengths and movable transversely of the mold to eject the cast slugs or linotypes therefrom. A further object is to provide effective means for securely closing the end of the mold during the casting operation so as to avoid the escape of metal from the mold cavity. A still further object is to provide a mechanism of the kind referred to which is simple and positive in operation and which will serve to accurately form the slugs or linotypes and eject the same after the casting operation is completed.

The invention in one specific embodiment is described in the following specification and illustrated in the accompanying drawings in which:

Figure 1 is a front elevation of the mold and other parts of the machine directly co-operating therewith;

Figure 2 is a longitudinal section taken on the line between the upper and lower mold blocks of Figure 1, certain parts appearing in elevation;

Figure 3 is a detailed sectional view on the line 3—3 of Figure 1;

Figure 4 is a detailed sectional view on the line 4—4 of Figure 1; and

Figure 5 is a detailed view showing principally the means for operating certain parts of the mechanism.

Referring to the drawings in detail 10 represents a lower fixed mold block cooperating with which is an upper movable mold block 11. The lower mold block 10 is secured in any suitable manner as by screws $10^a$ to a fixed part of the framework of the machine. The upper mold block 11 has a slight vertical movement, being provided with elongated openings $11^a$ in which screws 12 are mounted, these screws being also secured in a fixed part of the framework of the machine.

Arranged between the upper and lower mold blocks is a body piece 13 which is in the form of a horizontal blade, this blade being secured to a bar 14. The body piece 13 serves to close the right hand end of the mold during the casting operation and during such operation the line of assembled matrices is clamped between the end of the bar 14 and body piece 13 and a projection hereinafter referred to on another part of the mechanism.

An end gate 15 is arranged at the end of the mold, this gate being vertically movable to close and open the left end of the mold. The end gate 15 is operated in the following manner: A slide 16 is arranged above the upper mold block and is mounted in fixed guideways 17. The end gate is connected to the slide 16 by a link 18 so that the end gate is operated directly by the slide, the link 18 being connected to a spring pressed plunger $18^a$ arranged in the slide by means of which the link is yieldingly held in its lowermost position. The end gate 15 is provided with a projection $15^a$ which constitutes an abutment against which the matrices are clamped during the casting operation.

Beneath the end gate 15 there is arranged a vertically sliding bridge $15^b$ which is normally pressed upward by a spring $15^c$ and limited in its upward movement by a screw $15^d$ so that when moved to its upper position by the spring the upper surface of the bridge registers with the upper surface of the lower mold block 10 and forms a platform over which the cast slugs or bars are moved from the mold into other parts of the machine.

In order to hold the end gate 15 securely against the mold during the casting operation there is provided an end gate clamp 19 which is operated by means of an eccentric 20 which is pivoted about a screw 21 secured to a fixed part of the machine. The eccentric 20 is provided with an arm 22 which is connected through the medium of a spring link 23 with the slide 16 above described.

At the right hand end of the slide 16 there is provided a projection 24 which engages a plunger 25 secured to the upper mold block 11. The projection 24 is spring pressed downward by a spring 26 mounted in the slide 16 so that such projection can yield when it moves downwardly into contact with the plunger 25. Surrounding the plunger 25 is a spring 27 which normally holds the plunger and upper mold block in a raised position so that pressure on the body piece 13 is relieved, it being understood that when the slide 16 carrying the projection 24 is moved downwardly the upper mold block 11 will be forced down toward the fixed mold block 10 and against the body piece 13 arranged between said blocks.

The slide 16 is moved up and down by a lever 30 shown in dotted lines in Figure 1 which is pivoted to a fixed part of the machine. This lever carries a block 31 operating in a slot 32 in the slide 16. The lever 30 is operated by a link 33 which is connected to a cam lever 34 having a roller 35 running in a groove in a cam 36 on the main cam shaft of the machine. As the levers 30 and 34 work in planes at right angles to each other the link 33 is preferably connected to them by universal joints as shown.

It will be understood that the body piece 13 may be adjusted so as to permit the casting of slugs or linotypes of different lengths and the mechanism for accomplishing this result will be briefly described. The bar 14 is carried by a block 40 which slides between rails 41, 42 secured in fixed position upon the rigid plate or bracket 43. The bar 14 has a tongue 44 which enters a slot in the block 40 and is secured therein by a screw 45. The block 40, together with the bar 14 and the body piece 13 is moved by means of a forked arm 46 which is operated by suitable cam mechanism secured to the main shaft of the machine.

The rearward or right hand movement of the block and body piece which determines the length of the mold opening and of the slug or linotype, is limited by a stepped cylinder 50 which may be rotated to bring any one of the steps into line with the post 51 on the right hand end of the sliding block 40, such rotation of the stepped cylinder being secured by means of gears 52 and sprocket chain 53 and shaft 54, which can be turned by means of a knob 55. The length of lines corresponding to the steps of the cylindrical block 50 are indicated on the scale 56 attached to the shaft 54.

By means of mechanism, not shown and which constitutes no part of the present invention, the setting of the stepped cylinder 50 also determines the maximum length of the line of matrices and space bands which can be assembled in the assembling mechanism of the machine.

As heretofore noted the block 50, together with the bar 14 and body piece 13 are moved by means of a forked lever 46 which lever engages a roller 57 arranged in the block 40. The parts of the mechanism are so arranged that the lever 46 will normally hold the pin 51 on the block 40 a short distance from the stepped block 50. When the machine begins its cycle of operations the lever 46 moves the pin 51 against the block 50 which determines the length of the line of assembled matrices that can be inserted between the bar 14 and the end gate 15. After the assembled line is positioned before the mold and after the casting operation is completed and the upper mold block and end gate 15 are raised the cast slug or linotype, by advance of the bar 14 and the body piece 13 toward the left, will be ejected from the mold over the bridge 15^h. The block 40 with the bar 14 and body piece 13 are then returned to their normal position.

It is apparent that various changes and modifications of the mechanism may be made without departing from the true spirit or scope of the invention which is not limited to the specific details herein described.

Having thus described the invention what I claim as new and desire to secure by Letters Patent is:

1. In a typographic machine having a casting mechanism, a mold comprising a fixed lower block, a vertically movable upper block, an adjustable body piece between said blocks, spring operated means for normally relieving the body piece of pressure of the upper mold block, a slide, and a spring plunger for yieldingly clamping said upper mold block upon the body piece during the casting operation.

2. In a typographic machine having a casting mechanism, the combination with a mold comprising a fixed lower mold block, a vertically movable upper mold block, an intermediate body piece for closing one end of the mold, and a vertically movable end gate for closing the other end of the mold, of a common slide for moving the end gate to close the mold and for clamping the upper mold block upon the body piece, and means for reciprocating said slide.

3. In a typographic machine having a casting mechanism, the combination with a mold comprising a fixed lower mold block, a vertically movable upper mold block, an intermediate body piece for closing one end of the mold, and a vertically movable end gate for closing the other end of the mold, of a common slide for moving the end gate to close the end of the mold, and for clamping the end gate against the mold blocks, and means for reciprocating said slide.

4. In a typographic machine having a casting mechanism, the combination with a mold comprising a fixed lower mold block, a vertically movable upper mold block, and intermediate body piece for closing one end of the mold, and a vertically movable end gate for closing the other end of the mold, of a movable slide, spring means carried by the slide for clamping the upper mold block on the body piece, means connected with the slide for moving the end gate, and additional means carried by the slide for clamping the end gate against the mold blocks.

5. In a typographic machine having a casting mechanism, the combination with a mold comprising upper and lower blocks and an intermediate body piece, of an end gate vertically movable to close one end of the mold during the casting operation, a bridge piece adapted to form a continuation of the bottom of the mold cavity when the slug is being ejected from the mold, said bridge piece being arranged below the end gate and movable out of the path of the end gate when the latter is moved to close the mold, and a spring for returning said bridge piece to its original position after the end gate is withdrawn.

6. In a typographic machine having a casting mechanism, the combination with a mold comprising upper and lower blocks and an intermediate body piece, of an end gate adjacent the open end of the mold and movable to close the mold during the casting operation, and a spring operated bridge piece below the end gate, said bridge piece being normally aligned with the lower surface of the mold to support a slug being ejected from the mold and being arranged to yield when the end gate is moved into position to close the mold.

7. In a typographic machine having a casting mechanism, the combination with a mold comprising upper and lower blocks and an intermediate body piece, of an end gate vertically movable to close one end of the mold during the casting operation, and a bridge piece adapted to form a continuation of the bottom of the mold cavity when the slug is being ejected from the mold, said bridge piece being separate from the end gate and arranged below the end gate and movable out of the path of the end gate when the latter is moved to close the mold.

8. In a typographic machine having a casting mechanism, the combination of a mold comprising a fixed lower mold block, a vertically movable upper mold block, a body piece arranged between said blocks, means comprising a stepped gauge for positioning said body piece to cast slugs of different length, and means for moving said body piece to eject the cast slugs from the mold.

9. In a typographic machine having a casting mechanism, the combination of a mold comprising a fixed lower mold block, a vertically movable upper mold block, a body piece arranged between said blocks, a cylindrical stepped gauge for positioning said body piece to cast lines of different length, means for clamping said upper mold block on the body piece after the same is positioned by said gauge, and means for moving said body piece to eject the cast slugs from the mold.

10. In a typographic machine, a mold comprising upper and lower blocks, an intermediate body piece, an end gate, means for moving the end gate to close the opening between said blocks, a resiliently mounted bridge piece arranged beneath the end gate and in the path of movement of the same, and means for clamping the end gate in position to close the opening between said blocks.

11. In a typographic machine, a mold comprising a fixed lower mold block and a movable upper mold block, an end gate for closing the opening between the ends of said blocks, a reciprocating slide, means carried by said slide for moving said end gate, and other means carried by said slide for yieldingly forcing said upper mold block toward the lower mold block as the end gate is moved downwardly.

12. In a typographic machine, a mold comprising upper and lower members, an intermediate body piece, an end gate, means for raising and lowering the end gate to open and close the end of the mold, and means for automatically clamping the end gate in position during the casting operation, said last named means comprising a clamping block and an eccentric device for moving said block laterally toward and from the end gate.

13. In a typographic machine, a mold comprising a fixed lower mold block, a movable upper mold block, an intermediate body piece, an end gate, a clamp for holding said end gate in position during the casting operation, an eccentric for operating said clamp, means for yieldingly moving said upper mold block toward the lower mold block, and means for simultaneously operating said eccentric to clamp the end gate.

14. In a typographic machine having a casting mechanism, the combination of a mold comprising a fixed mold block and a movable mold block, a body piece arranged between said blocks, a stepped gauge for positioning said body piece to cast lines of different lengths, means for adjusting said gauge, means for clamping said movable mold block on the body piece after the same is positioned by said gauge, and means for moving said body piece to eject the cast slugs from the mold.

15. In a typographic machine, in combination, a fixed lower mold block and a movable upper mold block, an intermediate body piece, an end gate for closing the opening between said blocks, a clamp for holding said end gate in position during the casting operation, a vertically movable slide, means carried by said slide for moving said end gate and operating said clamp, and other means carried by said slide for yieldingly forcing said upper mold block toward the lower mold block.

In testimony whereof I affix my signature.

FREDERICK W. LETSCH.